United States Patent
Lister (10) Patent No.: US 10,322,723 B2
(45) Date of Patent: Jun. 18, 2019

(54) VARIATOR-ASSISTED TRANSMISSION AND LAUNCH CONTROL METHODS FOR SUCH A TRANSMISSION

(71) Applicant: Caterpillar Inc., Peoria, IL (US)

(72) Inventor: Brian E. Lister, Edwards, IL (US)

(73) Assignee: Caterpillar Inc., Deerfield, IL (US)

( * ) Notice: Subject to any disclaimer, the term of this patent is extended or adjusted under 35 U.S.C. 154(b) by 88 days.

(21) Appl. No.: 15/315,230

(22) PCT Filed: Jun. 12, 2015

(86) PCT No.: PCT/US2015/035526
§ 371 (c)(1),
(2) Date: Nov. 30, 2016

(87) PCT Pub. No.: WO2015/191984
PCT Pub. Date: Dec. 17, 2015

(65) Prior Publication Data
US 2017/0101100 A1    Apr. 13, 2017

(30) Foreign Application Priority Data
Jun. 13, 2014 (EP) .................................... 14172315

(51) Int. Cl.
*B60W 10/02* (2006.01)
*B60W 30/18* (2012.01)
(Continued)

(52) U.S. Cl.
CPC ...... *B60W 30/18027* (2013.01); *B60W 10/02* (2013.01); *B60W 10/103* (2013.01);
(Continued)

(58) Field of Classification Search
None
See application file for complete search history.

(56) References Cited

U.S. PATENT DOCUMENTS

| 4,542,665 A | 9/1985 | Yamamuro et al. |
| 5,337,629 A | 8/1994 | Kita |

(Continued)

FOREIGN PATENT DOCUMENTS

| DE | 4401509 A1 | 8/1994 |
| DE | 19631294 A1 | 2/1997 |

(Continued)

OTHER PUBLICATIONS

Search Report for related European Application No. 14172315.5; reported on Jan. 12, 2015.

(Continued)

*Primary Examiner* — Dirk Wright
(74) *Attorney, Agent, or Firm* — Murgitroyd & Company Miller, Matthias & Hull (57) ABSTRACT

A launch control method for a continuously variable transmission (CVT) is provided, where the CVT comprises a hydro-mechanical variator, a summing transmission connected to an output side of the variator, and a clutch for selectively connecting the summing transmission to an output member. The method determines whether a launch has been requested, and adjusts a variable displacement pump of the variator to a predetermined fixed displacement. Engagement of the clutch is commenced, and the method then determines whether a predetermined degree of slip exists between input and output elements of the clutch. The clutch is held at its present state of engagement when the predetermined degree of slip has been established, and the variator is placed into a torque control mode. The method then determines when there is zero slip between the input and output elements of the clutch, and then instructs full engagement of the clutch. The method then holds the pump of the variator at its current displacement until a predetermined (Continued)

time period has elapsed, before reverting to a standard transmission control algorithm. A CVT is also provided.

11 Claims, 4 Drawing Sheets (51) Int. Cl.
*B60W 10/103* (2012.01)
*F16H 47/04* (2006.01)
*B60W 10/115* (2012.01)
*F16H 61/42* (2010.01)

(52) U.S. Cl.
CPC ........... *B60W 10/115* (2013.01); *F16H 47/04* (2013.01); *F16H 61/42* (2013.01); *B60W 2510/0208* (2013.01); *B60W 2510/0241* (2013.01); *B60W 2510/104* (2013.01); *B60W 2710/021* (2013.01); *B60W 2710/026* (2013.01); *B60W 2710/1005* (2013.01); *B60W 2710/105* (2013.01); *B60Y 2300/785* (2013.01)

(56) References Cited

U.S. PATENT DOCUMENTS

| | | |
|---|---|---|
| 5,667,456 A | 9/1997 | Fellows |
| 5,980,411 A | 11/1999 | Wontner |
| 6,336,888 B1 | 1/2002 | Eguchi |
| 6,485,387 B1 * | 11/2002 | Goodnight .............. F16H 47/04 475/76 |
| 7,530,914 B2 * | 5/2009 | Fabry ..................... F16H 47/04 475/82 |
| 8,523,724 B2 * | 9/2013 | Moloney ................. F16H 47/04 475/83 |
| 8,986,162 B2 * | 3/2015 | Dix ...................... B60W 10/103 477/68 |
| 9,261,181 B2 * | 2/2016 | Rintoo .................... F16H 3/728 |
| 9,874,279 B1 * | 1/2018 | Guo ........................ F16H 61/70 |
| 2003/0073540 A1 | 4/2003 | Eguchi et al. |
| 2004/0018864 A1 | 1/2004 | Ho et al. |
| 2006/0184304 A1 | 8/2006 | Katou et al. |
| 2009/0118917 A1 | 5/2009 | Sah et al. |
| 2009/0312929 A1 | 12/2009 | Doebele et al. |
| 2013/0085647 A1 | 4/2013 | Lister et al. |
| 2013/0138306 A1 | 5/2013 | Schultz et al. |

FOREIGN PATENT DOCUMENTS

| | | |
|---|---|---|
| DE | 19905447 A1 | 12/1999 |
| DE | 10003174 A1 | 9/2000 |
| EP | 0276255 A1 | 8/1988 |
| EP | 0550098 A1 | 7/1993 |
| JP | H 04203653 A | 7/1992 |
| JP | 2001041315 A | 2/2001 |
| JP | 2003021176 A1 | 1/2003 |
| JP | 2007100891 | 10/2005 |
| JP | 2009138895 A | 6/2009 |
| JP | 2012007742 A | 1/2012 |
| WO | WO 2008/038043 A | 4/2008 |
| WO | WO 2012/070939 A2 | 5/2012 |

OTHER PUBLICATIONS

European Search Report issued in related European Application No. 14172315.5—1755; dated Dec. 1, 2015.

* cited by examiner

VARIATOR-ASSISTED TRANSMISSION AND LAUNCH CONTROL METHODS FOR SUCH A TRANSMISSION

CROSS-REFERENCE TO RELATED APPLICATION

This Application is a 35 USC § 371 US National Stage filing of International Application No. PCT/US2015/035526 filed on Jun. 12, 2015, and claims priority under the Paris Convention to European Patent Application No. EP 14172315.5 filed on Jun. 13, 2014.

FIELD OF THE DISCLOSURE

The present invention relates to the field of continuously variable transmissions (CVTs) and more particularly to CVTs which split the input to the transmission between a summing transmission and a variator. Specifically, the present invention provides a variator-assisted CVT and methods of controlling the launch phase of such a transmission.

BACKGROUND OF THE DISCLOSURE

Variator-assisted CVTs are known and have been primarily devised in order to replace a conventional CVT in applications where a wide spread of gear ratios are desired. To do so with a conventional CVT would mean providing a CVT which is large and heavy, which is undesirable in a vehicle. Variator-assisted CVTs work by taking a torque received at the transmission input shaft from an engine and splitting that torque into two paths: one which is directed to the transmission output through a summing transmission alone, and the other which is directed through the variator and the summing transmission.

One limitation of some variator-assisted transmission (VAT) configurations is that it is not possible to achieve a zero ground speed (i.e. where the vehicle is not moving) using the variator without slipping or disengaging a clutch. Thus, a vehicle employing such a transmission will always "creep" if a clutch of the transmission is engaged. Reducing the input engine speed to the transmission reduces the amount of creep but cannot eradicate it without shutting down the engine.

One way of overcoming this limitation is to connect the variator output side directly to the output shaft by way of a variator clutch. In such an arrangement the variator would be connected to the input side of the summing transmission as normal, but could be selectively connected directly to the output shaft when the clutch between the summing transmission output and the output shaft is disengaged. The VAT can then not only achieve zero speed with a clutch engaged but can also provide very low output speeds for a crawling/inching mode, and launch the vehicle from zero output speed into the standard transmission modes by varying the output of the variator. One disadvantage of this solution is that the additional parts required to connect the variator in this way increase the overall cost and complexity of the transmission.

VAT configurations exist which can launch from zero speed, but each has its own disadvantages. One way is to manipulate the gear ratios of the VAT but this reduces the maximum travel speeds in forward and reverse modes. An alternative is to utilize a variator with higher speed capacity, but such a variator would be more expensive.

It is an aim of the present invention to obviate or mitigate one or more of these disadvantages.

SUMMARY OF THE DISCLOSURE

According to a first aspect of the invention there is provided a launch control method for a continuously variable transmission where the transmission comprises a hydro-mechanical variator, a summing transmission connected to an output side of the variator, and a clutch for selectively connecting the summing transmission to an output member. The launch control method comprises the steps of:
    determining whether a launch has been requested;
    adjusting a variable displacement pump of the variator to a predetermined fixed displacement;
    commencing engagement of the clutch;
    determining whether a predetermined degree of slip exists between input and output elements of the clutch;
    holding the clutch at its present state of engagement when the predetermined degree of slip has been established;
    placing the variator into a torque control mode;
    determining when there is zero slip between the input and output elements of the clutch;
    instructing full engagement of the clutch; and
    holding the pump of the variator at its current displacement until a predetermined time period has elapsed.

According to a second aspect of the invention there is provided a launch control method for a variator-assisted transmission comprising a hydro-mechanical variator, a summing transmission connected to an output side of the variator, and low and high speed clutches for selectively connecting the summing transmission to an output member. The launch control method comprises the steps of:
    determining whether a launch has been requested;
    adjusting a variable displacement pump of the variator to a predetermined fixed displacement;
    commencing engagement of the low and high speed clutches;
    determining whether a predetermined degree of slip exists between input and output elements of the low speed clutch;
    holding both clutches at their present state of engagement when the predetermined degree of slip has been established;
    placing the variator into a torque control mode;
    determining when there is zero slip between the input and output elements of either the low or high speed clutch;
    instructing full engagement of whichever of the clutches has been determined to have zero slip; and
    holding the pump of the variator at its current displacement until a predetermined time period has elapsed.

According to a third aspect of the invention there is provided a continuously variable transmission, comprising:
    an input shaft connectable to an engine;
    an output shaft connectable to a load;
    a hydro-mechanical variator having an input side connecting the input shaft to a variable displacement pump, and an output side;
    a summing transmission connected to the input shaft and the output side of the variator;
    a first clutch which selectively connects a first output element of the summing transmission to the output shaft;
    a plurality of sensors monitoring the rotational speed of the first output element and the output shaft; and
    a controller which controls the displacement of the variator pump and the degree of engagement of the clutch in response to data received from the plurality of sensors.

BRIEF DESCRIPTION OF THE DRAWINGS

Preferred embodiments of the present invention will now be described, by way of example only, with reference to the following drawings where.

DETAILED DESCRIPTION OF THE DISCLOSURE

Figure 1:
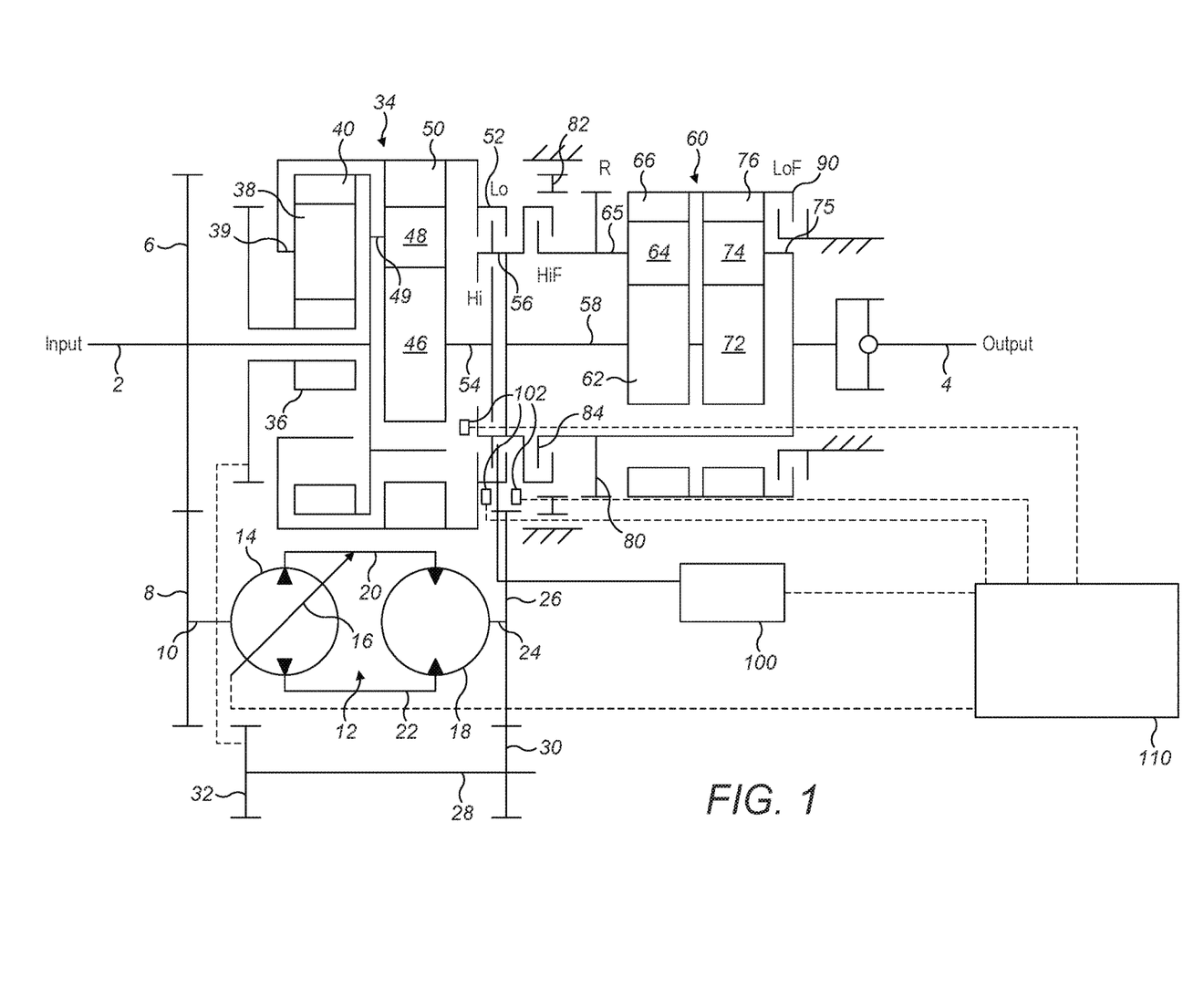
FIG. 1 is a schematic illustration of a variator-assisted transmission.

FIG. 1 schematically illustrates a variator-assisted transmission (VAT). The transmission comprises a transmission input shaft 2 which in operation will be connected to the engine of a vehicle (not shown), and a transmission output shaft 4 which will be connected to a load (not shown) such as the wheels of the vehicle. The input shaft 2 carries an input gear 6 which is meshed with a first satellite gear 8 which is carried on a variator input shaft 10 which lies in parallel to the input shaft 2. The input shaft 10 drives a hydro-mechanical variator, generally designated 12. The variator 12 comprises a variable-volume pump 14 which is driven by the input shaft 10. The pump 14 has a control element or swash plate 16 of a known type, and is fluidly connected to a hydraulic motor 18, in this preferred embodiment by a pair of hydraulic lines 20,22. The motor 18 is connected to a variator output shaft 24 which carries a variator output gear 26. A layshaft 28 lies parallel to the variator shafts 10,24 and has a first layshaft gear 30 which meshes with the output gear 26, and a second layshaft gear 32 which meshes with a first sun gear 36 of a summing transmission 34.

The summing, or differential, transmission, 34 comprises first and second planet gears 38,48 which are rotatably supported on first and second planet carriers 39,49. The first planet gear 38 meshes with the first sun gear 36 and a first ring gear 40. The second planet gear 48 meshes with a second sun gear 46 and a second ring gear 50. The first ring gear 40 and the second planet carrier 49 are connected to the input shaft 2 such that rotation of the input shaft 2 rotates these two elements as well. The first planet carrier 39 and the second ring gear 50 are connected to an input side of a first low speed clutch 52. The second sun gear 46 is non-rotatably connected to a first intermediate shaft 54, which is co-axial with the input and output shafts 2,4. The first intermediate shaft 54 is connected to an input side of a first high speed clutch 56.

The first low and high speed clutches 52,56 selectively connect the summing transmission 34 with an output, or range, transmission 60 such that the transmissions 34,60 are co-axial with one another. Both the clutches 52,56 are located in a connecting space defined between the summing and output transmissions 34,60. As stated above, the input side of each of the low and high speed clutches 52,56 is connected to at least one element of the summing transmission 34. An output side of each of the first low and high speed clutches 52,56 is connected to a second intermediate shaft 58, which is co-axial with the transmission input and output shafts 2,4 and the first intermediate shaft 54. The output transmission 60 comprises third and fourth sun gears 62,72 which are both connected to the second intermediate shaft 58. The third sun gear 62 meshes with a third planet gear 64 which is rotatably supported upon a third planet carrier 65, and the third planet gear 64 meshes with a third ring gear 66. The fourth sun gear 72 meshes with a fourth planet gear 74 which is rotatably supported upon a fourth planet carrier 75, and the fourth planet gear 74 meshes with a fourth ring gear 76. The third planet carrier 65 is connected to a reverse member 80, which in order to provide a reverse rotation at the output shaft 4 may be selectively held against rotation by a sliding collar 82.

As well as being selectively connected to the second intermediate shaft 58, the first low and high speed clutches 52,56 are also selectively connected to the input side of a second high speed clutch 84. The second high speed clutch 84 is located in the connecting space with the first low and high speed clutches 52,56 and has an output side connected to the third planet carrier 65. Thus, when the second high speed clutch 84 is engaged the third sun and planet gears 62,64 are locked together and will rotate as one.

The third and fourth ring gears 66,76 are connected to one another and a second low speed clutch, or braking element, 90. When the second low speed clutch 90 is engaged the third and fourth ring gears 66,76 are prevented from rotating. The fourth planet carrier 75 is connected to the output shaft 4.

Whilst preferred it should be understood that the range transmission is an optional, rather than essential, element of the invention. The transmission could instead simply have the second intermediate shaft connecting the first low and high speed clutches directly to the output shaft 4 without the presence of the range transmission.

The clutches in the illustrated embodiment are hydraulically actuated, and the VAT further comprises at least one hydraulic fluid manifold 100 which includes at least one control valve (not shown). The manifold 100 controls flow of hydraulic fluid from a hydraulic fluid source (not shown) to the first low and high speed clutches 52,56 and, when present, the second low and high speed clutches 90,84. The VAT also includes a plurality of sensors 102 which monitor the rotational speed of the output elements of the summing transmission 34 (that is, the second ring gear 50 and the first intermediate shaft 54) on an input side of the first low and high speed clutches 52,56 and the output shaft 4 or second intermediate shaft 58 on an output side of the first clutches.

A controller 110 receives data from the sensors 102 and from that data can establish the degree of clutch slip, if any in the first clutches 52,56. The controller 110 also effects control of the manifold 100 and valves therein so as to selectively engage and disengage the clutches 52,56,90,84 and vary the pressure applied at the clutch plates (not shown).

INDUSTRIAL APPLICABILITY

Figure 2:
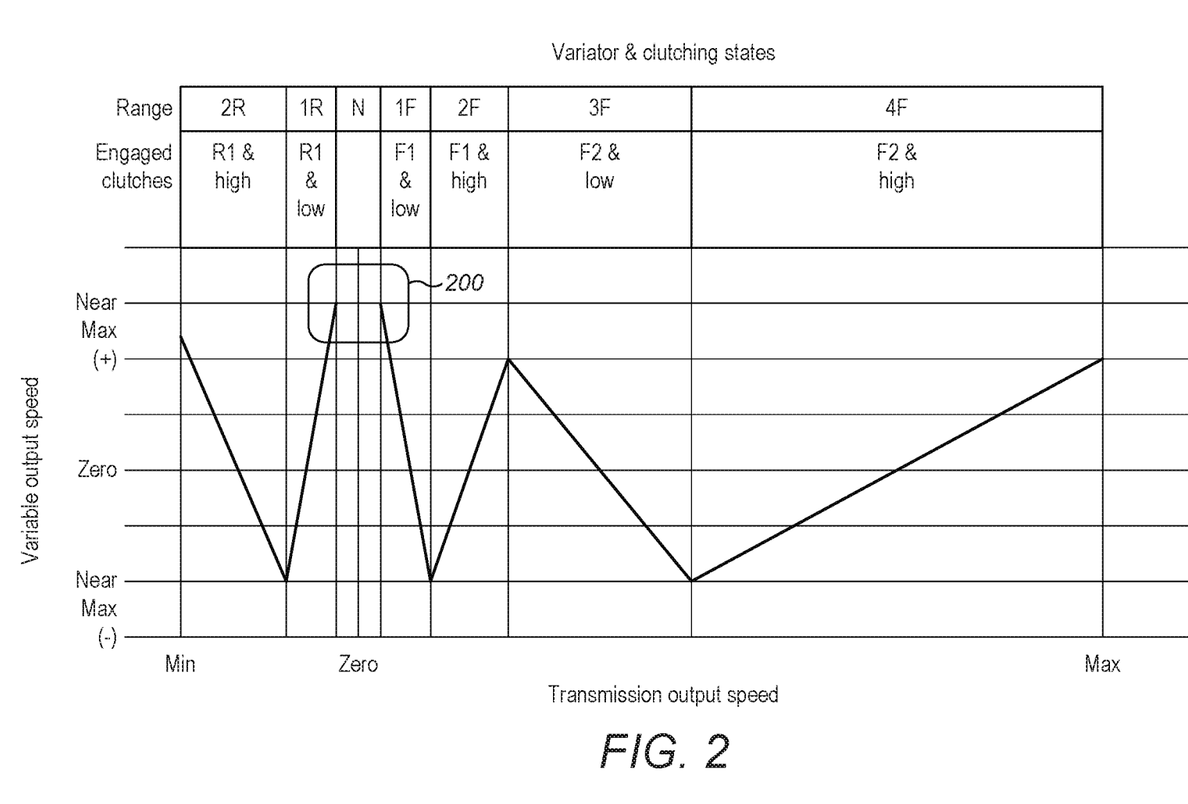
FIG. 2 is a graph showing variator output speed versus transmission output speed across various modes of the variator-assisted transmission.

FIG. 2 illustrates how the speed of the variator motor 18 and rotational speed of the output shaft 4 are varied across various forward and reverse transmission modes. The VAT shown in FIG. 1 has two reverse transmission modes 1R,2R and four forward transmission modes 1F-4F, although it may only have two forward modes 1F,2F in the absence of the output transmission 60.

Referring to FIGS. 1 and 2, when the first forward transmission mode 1F is to be engaged the swash plate 16 of the variator pump 14 is adjusted to its maximum positive displacement so that the variator motor 18 is producing its maximum positive speed. The first and second low speed clutches 52,90 are both engaged. Power is therefore provided from the input shaft 2 to the output transmission 60 via the first ring gear 40, the first planet carrier 39 and second ring gear 50 of the summing transmission 34, and the first low speed clutch 52. From the first low speed clutch 52 power is provided to the output shaft 4 via the second intermediate shaft 58, the fourth sun gear 72 and fourth planet carrier 75 of the output transmission 60.

With the engine input speed substantially constant, acceleration of the vehicle through the first transmission mode 1F is achieved by control of the variator 12. As can be seen in FIG. 2, as the variator's positive displacement and associated speed is reduced towards zero and beyond to a negative displacement and associated speed the transmission output speed increases. This speed variation is based upon the rotational direction and speed of the first sun gear 36 as dictated by the variator 12.

To increase vehicle speed further, the transmission must be shifted from the first forward mode 1F to the second forward mode 2F. This involves disengaging the first low speed clutch 52 and engaging the first high speed clutch 56 whilst the second low speed clutch 90 remains engaged and braking the ring gears 66,76 in the output transmission 60. With these changes implemented, power is provided to the first high speed clutch 56 from the input shaft 2 via the second planet carrier 49, the second sun gear 46 and the first intermediate shaft 54. From the first high speed clutch 56 power is still provided to the output shaft 4 via the second intermediate shaft 58, the fourth sun gear 72 and fourth planet carrier 75.

Again, acceleration of the vehicle in the second forward mode 2F is achieved by control of the variator 12. Referring again to FIG. 2, as the variator's negative displacement and associated speed is increased back towards zero and beyond to a positive displacement and associated speed the transmission output speed increases further due to the variation in rotational speed and direction of the first sun gear 36 compared with the second sun gear 46.

Further increases in vehicle speed are possible through the optional output transmission 60 and its associated third and fourth forward modes 3F and 4F. To enter the third mode 3F from the second mode 2F the first high speed clutch 56 and second low speed clutch 90 are disengaged, and the first low speed clutch 52 and second high speed clutch 84 are engaged. Consequently, power is provided to the first low speed clutch 52 from the input shaft 2 via the first ring gear 40, the first planet carrier 39 and the second ring gear 50. With the second high speed clutch 84 engaged in the embodiments shown in FIGS. 1-4 and 7, the second intermediate shaft 58, its associated sun gears 62,72 and the third planet carrier 65 rotate as one. This results in a step change reduction in the rotational speed of the second intermediate shaft 58 in the third mode 3F compared to the second mode 2F. With the second low speed clutch 90 now disengaged, the third and fourth ring gears 66,76 can rotate relative to the remaining components of the output transmission 60, with the result that power is provided to the output shaft 4 via the fourth planet carrier 75.

Again, as seen in FIG. 2, transmission output speed is increased in the third forward mode 3F as the variator's displacement is once again decreased from its maximum positive displacement and rotational speed through zero speed until the first sun gear is once again rotating at its maximum negative speed.

The fourth forward mode 4F is entered from the third mode 3F by disengaging the first low speed clutch 52 and engaging the first high speed clutch 56 whilst the second high speed clutch 84 remains engaged. Thus, power is provided from the input shaft 2 to the first high speed clutch 56 via the second planet carrier 49, the second sun gear 46 and the first intermediate shaft 54. When the second high speed clutch 84 is engaged power is provided to the output shaft 4 in the same manner as described above in respect of the third mode 3F.

Again, acceleration of the vehicle through the fourth forward mode 4F is achieved by control of the variator 12. Referring again to FIG. 2, as the variator's negative displacement and associated speed from the previous mode 3F is increased towards zero and beyond to a positive displacement and associated speed, the transmission output speed increases further due to the variation in rotational speed and direction of the first sun gear 36 compared with the second sun gear 46.

As also seen in FIG. 2, the VAT also has two reverse transmission modes 1R and 2R. In order to engage the initial reverse transmission mode 1R, all of the clutches within the transmission are disengaged except for the first low speed clutch 52. At the same time the sliding collar 82 is brought into contact with the reverse member 80, with the result that the reverse member and third planet carrier 65 are held against rotation by the collar 82. Power is therefore provided to the first low speed clutch 52 from the input shaft 2 via the first ring gear 40, the first planet carrier 39 and the second ring gear 50.

The second intermediate shaft 58 and its associated sun gears 62,72 rotate in a first direction due to the engagement of the first low speed clutch 52. Due to the third planet carrier 65 being held against rotation the third and fourth ring gears 66,76 rotate in the opposite direction to that of the sun gears 62,72. This means that the fourth planet carrier 75 and the output shaft 4 are also rotating in the opposite direction so that the vehicle moves in the reverse direction.

If greater ground speed is required whilst in reverse, the transmission can be moved from the first reverse mode 1R to the second reverse mode 2R. To do so, the first low speed clutch 52 is disengaged and the first high speed clutch 56 is engaged whilst the sliding collar 82 continues to engage and hold the reverse member 80 and third planet carrier 65 against rotation. In this mode, power is once again provided to the first high speed clutch 56 via the second planet carrier 49, the second sun gear 46 and the first intermediate shaft 54. Power is provided to the output shaft 4 via the output transmission in the same manner as described in respect of the first reverse mode 1R.

In either reverse mode 1R,2R, the ground speed of the vehicle can once again be adjusted by adjusting the rotational speed and direction of the first sun gear 36 via the variator 12 in the same manner as described for the four forward modes 1F-4F and as seen in FIG. 2.

Figure 3:
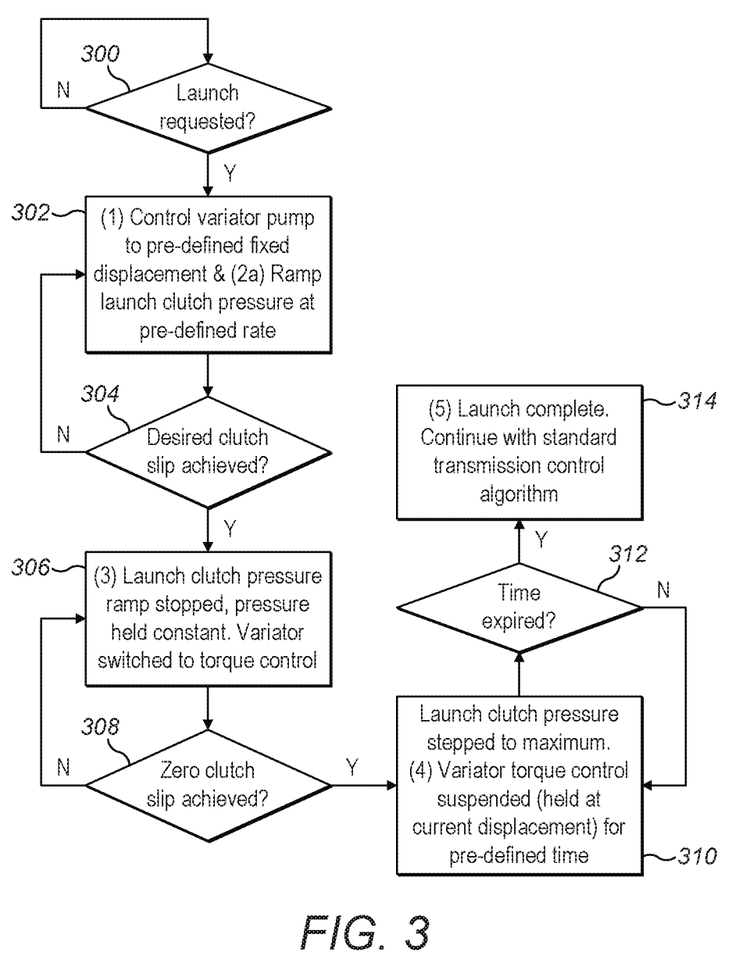
FIG. 3 is a flow diagram illustrating a first launch control process for a variator-assisted transmission having a single clutch.
Figure 4:
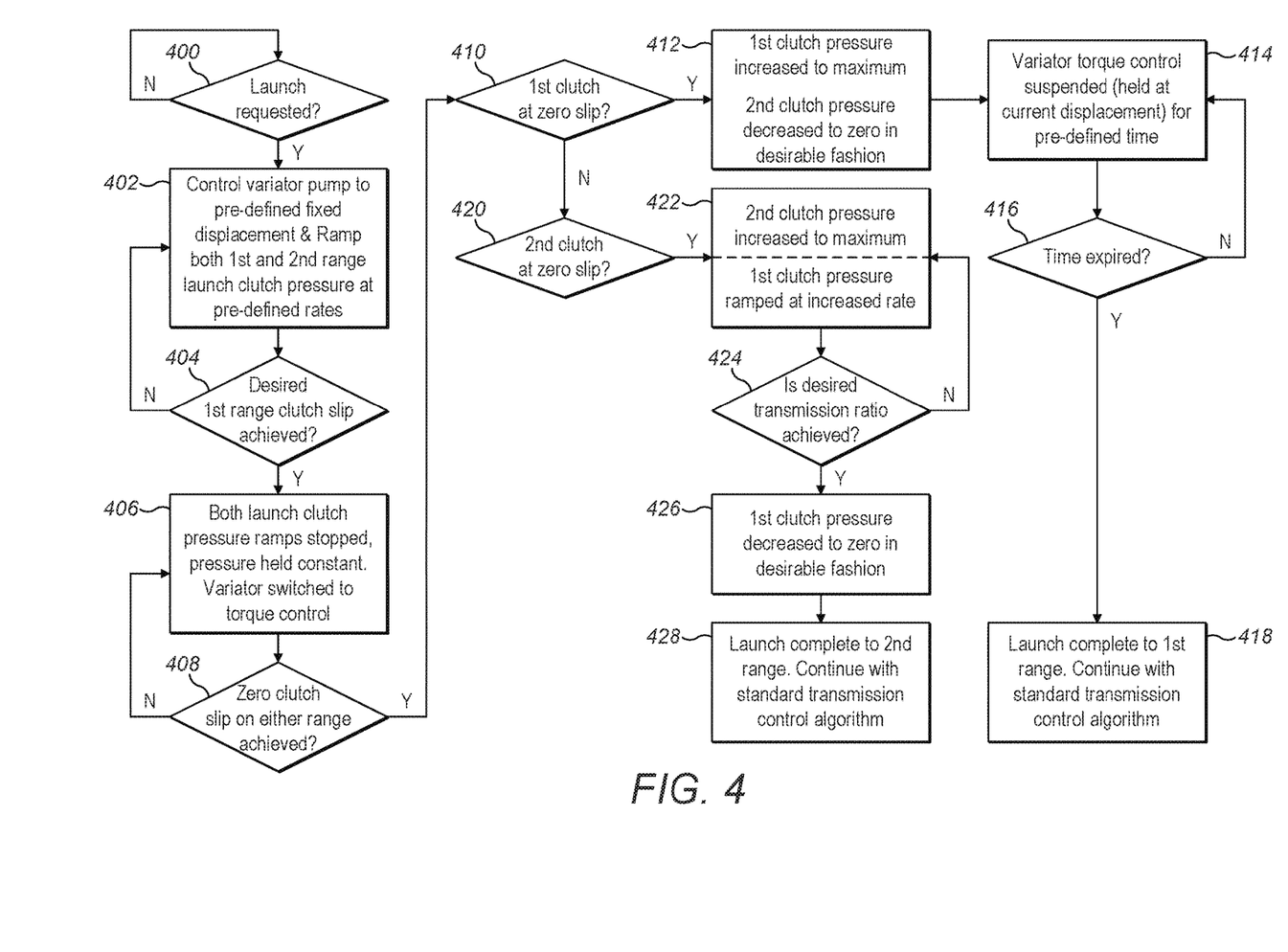
FIG. 4 is a flow diagram illustrating a second launch control process for a variator-assisted transmission having a pair of clutches.

The foregoing description describes how the transmission enters either the initial forward or reverse modes 1F,1R from a non-zero output speed. However, FIG. 2 also shows a portion of the graph, generally designated 200, in which the transmission is in a neutral, pre-launch mode N. As can be seen, the neutral mode N lies at the beginning of either the first forward or reverse modes 1F,1R and represents a condition wherein the transmission output speed is zero and the vehicle is to be launched in either the forward or reverse direction. FIGS. 3 and 4 show two processes which can be employed by the transmission in this launch phase.

FIG. 3 illustrates a launch control process for the transmission from zero output speed when only a single clutch is utilised during launch between the summing transmission and the output shaft. The process will be described with reference to FIGS. 1 and 3. At determination step 300 the controller 110 determines whether a launch request has been initiated by the vehicle operator. This may be, for example, by the operator selecting the first forward or reverse mode 1F,1R of the transmission. Upon receipt of the request, in process step 302 the controller 110 instructs the swash plate 16 of the variator pump 14 to adjust such that the pump now has a predetermined fixed displacement, and instructs the manifold 100 to increase the hydraulic pressure at the clutch 52 at a predetermined rate. At the next determination step 304, the controller analyses the data received from the sensors 102 in order to determine whether a desired degree of clutch slip has been achieved between the input and output sides of the clutch 52. If not, then the process returns to process step 302.

When determination step 304 establishes that the desired degree of clutch slip has been achieved, process step 306 has the controller 110 instruct the manifold 100 to keep the hydraulic pressure at the clutch 52 constant. At the same time the controller 110 switches the variator pump 14 into a torque control, or optimisation, mode. In this mode the controller 110 will selectively adjust the displacement of the pump 14, and hence the output of the variator motor 18, in order to ensure that the transmission generates the optimum level of torque for the current operating condition of the transmission.

At the next determination step 308 the controller analyses the sensor data in order to establish whether there is now zero clutch slip between the input and output sides of the clutch 52. If not, the process reverts to process step 306. However, if step 308 establishes that there is now zero clutch slip then at step 310 the controller 110 will instruct the manifold 100 to immediately increase the clutch pressure to maximum. At the same time, the controller 110 suspends the torque control mode and instructs the variator pump 14 to hold its current displacement for a predetermined period of time. The subsequent determination step 312 establishes when that predetermined time period has elapsed, and if so the process moves to a final process step 314 in which the controller switches to a standard transmission control mode.

In some cases a transmission having more than one forward or reverse mode (such as that shown in FIG. 1) may accelerate a vehicle from launch so quickly that the conditions for entering the second mode (e.g. 2F or 2R) may be satisfied before the initial mode (1F or 1R) has been fully engaged. FIG. 4 illustrates a launch control process for the transmission which addresses this issue when there are two clutches present in the transmission. For example, the transmission may comprise two summing output elements and the first low and high speed clutches 52,56 shown in FIG. 1. Again, the process is described with reference to FIG. 1 as well as FIG. 4.

At determination step 400 the controller 110 determines whether a launch request has been initiated by the vehicle operator. This may be, for example, by the operator selecting the first forward or reverse mode 1F,1R of the transmission. Upon receipt of the request, in process step 402 the controller 110 instructs the swash plate 16 of the variator pump 14 to adjust such that the pump now has a predetermined fixed displacement, and instructs the manifold 100 to increase the hydraulic pressure at both clutches 52,56 at predetermined rates. At the next determination step 404, the controller analyses the data received from the sensors 102 in order to determine whether a desired degree of clutch slip has been achieved between the input and output sides of the low speed clutch 52. If not, then the process returns to process step 402.

When determination step 404 establishes that the desired degree of clutch slip has been achieved at the low speed clutch 52, process step 406 has the controller 110 instruct the manifold 100 to keep the hydraulic pressure at the clutches 52,56 constant. At the same time the controller 110 switches the variator pump 14 into the torque control, or optimisation, mode described above with respect of the FIG. 3 process.

At the next determination step 408 the controller analyses the sensor data in order to establish whether there is now zero clutch slip between the input and output sides of either of the clutches 52,56. If not, the process reverts to process step 406. However, if step 408 establishes that there is now zero clutch slip at one of the clutches 52,56 then at step 410 the controller will determine if it is the low speed clutch 52 which has zero slip. If it is the low speed clutch 52 which has zero slip then at process step 412 the controller 110 will instruct the manifold 100 to immediately increase the low speed clutch pressure to maximum and to drop the high speed clutch pressure to zero, thereby disengaging the high speed clutch completely. At the next process step 414 the controller 110 suspends the torque control mode and instructs the variator pump 14 to hold its current displacement for a predetermined period of time. The subsequent determination step 416 establishes when that predetermined time period has elapsed. If so, the process moves to a final process step 418 in which the controller 110 switches to the first forward or reverse transmission mode 1F, 1R depending on the mode selected by the operator, and a standard transmission control process for moving between speed modes in whichever direction was selected.

In the event that determination step 410 determines that it is not the low speed clutch 52 which has zero slip it will confirm that it is the high speed clutch 56 at determination step 420. Following this determination, process step 422 involves the controller 110 instructing the manifold 100 to increase the pressure at the high speed clutch 56 to maximum, and to also increase the pressure at the low speed clutch 52 at a predetermined rate. At subsequent determination step 424 the controller will determine whether the transmission has successfully entered the desired higher transmission mode 2F or 2R via the full engagement of the high speed clutch 56. If not, the process will revert to process step 422. This step of the process ensures that the transmission is at the synchronous shift point between the transmission modes 1F and 2F, or 1R and 2R when the low speed clutch is released and thereby limits the probability of initiating a shift hunting event.

When the controller 110 has established that the desired transmission mode 2F or 2R has been entered at process step 426 it will instruct the manifold 100 to reduce the pressure of the low speed clutch 52 to zero, thereby fully disengaging the low speed clutch 52. Then, the process moves to a final process step 428 in which the controller 110 switches to the second forward or reverse transmission mode 2F, 2R, and a standard transmission control process for moving between speed modes in whichever direction was selected.

The present invention provides a VAT and launch control processes which can launch a vehicle from zero output speed using a cheaper and less complex arrangement of components than known VATs which have zero speed capability.

Although the preferred embodiment of the VAT employs hydraulically-actuated clutches, other types of clutch may be used. For example, each clutch may alternatively be an electro-mechanical clutch with the controller controlling the clutches by way of electrical actuators instead of the hydraulic fluid and manifold arrangement described herein.

As described above, the VAT may comprise a transmission having a single forward and/or reverse mode and a single clutch connecting the transmission output to the output shaft. Alternatively, the transmission may have two forward and/or reverse modes and a pair of clutches connecting the two transmission outputs to the output shaft, or indeed to the intermediate output transmission shown in the embodiment of FIG. 1.

These and other modifications and improvements may be incorporated without departing from the scope of the invention.

The invention claimed is:

1. A launch control method for a continuously variable transmission comprising a hydro-mechanical variator, a summing transmission connected to an output side of the variator, and a clutch for selectively connecting the summing transmission to an output member, the method comprising the steps of:
    determining whether a launch has been requested;
    adjusting a variable displacement pump of the variator to a predetermined fixed displacement;
    commencing engagement of the clutch;
    determining whether a predetermined degree of slip exists between input and output elements of the clutch;
    holding the clutch at its present state of engagement when the predetermined degree of slip has been established;
    placing the variator into a torque control mode;
    determining when there is zero slip between the input and output elements of the clutch;
    instructing full engagement of the clutch; and
    holding the pump of the variator at its current displacement until a predetermined time period has elapsed.

2. The method of claim 1 wherein the clutch is a hydraulic clutch and the steps of engaging and holding the clutch respectively comprise increasing and maintaining a hydraulic pressure at the clutch.

3. A launch control method for a variator-assisted transmission comprising a hydro-mechanical variator, a summing transmission connected to an output side of the variator, and low and high speed clutches for selectively connecting the summing transmission to an output member, the method comprising the steps of:
    determining whether a launch has been requested;
    adjusting a variable displacement pump of the variator to a predetermined fixed displacement;
    commencing engagement of the low and high speed clutches;
    determining whether a predetermined degree of slip exists between input and output elements of the low speed clutch;
    holding both clutches at their present state of engagement when the predetermined degree of slip has been established;
    placing the variator into a torque control mode;
    determining when there is zero slip between the input and output elements of either the low or high speed clutch;
    instructing full engagement of whichever of the clutches has been determined to have zero slip; and
    holding the pump of the variator at its current displacement until a predetermined time period has elapsed.

4. The method of claim 3, further comprising the step of disengaging the high speed clutch in the event that it is determined that the low speed clutch is to be fully engaged.

5. The method of claim 3, further comprising the steps of:
    increasing the degree of engagement of the low speed clutch in the event that it is determined that the high speed clutch is to be fully engaged;
    determining when the output member is rotating at a predetermined output speed with the high speed clutch fully engaged; and
    disengaging the low speed clutch when the output speed has been reached.

6. A continuously variable transmission, comprising:
    an input shaft connectable to an engine;
    an output shaft connectable to a load;
    a hydro-mechanical variator having an input side connecting the input shaft to a variable displacement pump, and an output side;
    a summing transmission connected to input shaft and the output side of the variator;
    a first clutch which selectively connects a first output element of the summing transmission to the output shaft;
    a plurality of sensors monitoring the rotational speed of the first output element and the output shaft; and
    a controller which controls the displacement of the variator pump and the degree of engagement of the clutch in response to data received from the plurality of sensors, wherein the controller is programmed to:
        determine whether a launch has been requested;
        adjust the variable displacement pump of the variator to a predetermined fixed displacement in response to determining that the launch has been requested;
        commence engagement of the first clutch;
        determine whether a predetermined degree of slip exists between the first output element and the output shaft based on data received from the plurality of sensors;
        hold the first clutch at its present state of engagement in response to determining that the predetermined degree of slip has been established;
        place the hydro-mechanical variator into a torque control mode;
        determine when there is zero slip between the first output element and the output shaft based on data received from the plurality of sensors;
        cause full engagement of the clutch in response to determining that there is zero slip between the first output element and the output shaft; and
        hold the variable displacement pump of the hydro-mechanical variator at its current displacement until a predetermined time period has elapsed.

7. The transmission of claim 6, further comprising a second clutch which selectively connects a second output element of the summing transmission to the output shaft, wherein the plurality of sensors monitor the rotational speed of the first and second output elements and the output shaft, and the controller controls the pump displacement and the degree of engagement of the first and second clutches in response to data received from the plurality of sensors.

8. The transmission of claim 6, wherein the first clutch comprises a hydraulic clutch and the transmission comprises a hydraulic fluid manifold in fluid communication with the hydraulic clutch, wherein the controller is programmed to hold the first clutch at its present state of engagement by causing the hydraulic fluid manifold to increase and maintain a hydraulic pressure at the first clutch.

9. The transmission of claim 6, further comprising a second clutch which selectively connects a second output element of the summing transmission to the output shaft, wherein the plurality of sensors monitor the rotational speed of the first and second output elements and the output shaft, and the controller controls the pump displacement and the degree of engagement of the first and second clutches in response to data received from the plurality of sensors, and wherein the controller is programmed to:

commence engagement of the first clutch and the second clutch in response to determining that the launch has been requested;

hold the first clutch and the second clutch at their present states of engagement in response to determining that the predetermined degree of slip has been established;

determine when there is zero slip between either the first output element and the output shaft at the first clutch or the second output element and the output shaft at the second clutch based on data received from the plurality of sensors; and instruct full engagement of the one of the first clutch and the second clutch determined to have zero slip.

10. The transmission of claim 9, wherein the controller is programmed to disengage the second clutch in response to determining that the first clutch has zero slip between the first output element and the output shaft.

11. The transmission of claim 9, wherein the controller is programmed to:

increase the degree of engagement of the first clutch in response to determining that the second clutch has zero slip between the second output element and the output shaft;

determine when the output shaft is rotating at a predetermined output speed with the second clutch fully engaged; and disengage the first clutch in response to determining that the output shaft is rotating at the predetermined output speed.

* * * * *